United States Patent [19]
Rivin et al.

[11] 3,867,326
[45] Feb. 18, 1975

[54] PRECIPITATED SILICA REINFORCING AGENTS AND RUBBER COMPOSITIONS CONTAINING SAME

[75] Inventors: Donald Rivin, Natick; George R. Cotten, Lexington, both of Mass.

[73] Assignee: Cabot Corporation, Boston, Mass.

[22] Filed: Dec. 13, 1973

[21] Appl. No.: 424,575

Related U.S. Application Data

[63] Continuation-in-part of Ser. No. 337,824, March 5, 1973, abandoned.

[52] U.S. Cl. ...... 260/37 N, 106/308 M, 106/308 N, 260/42.16, 260/42.32, 260/42.33, 260/42.34, 260/42.37, 260/42.47, 260/42.49, 260/239 E, 260/765, 260/766, 423/339
[51] Int. Cl. ..................... C08k 1/08, C08c 11/10

[58] Field of Search.... 106/308 M, 308 N; 423/336, 423/337, 339; 260/239 E, 37 N, 42.47

[56] References Cited
UNITED STATES PATENTS
3,431,231  3/1969  Darcy et al. ..................... 260/42.16

*Primary Examiner*—Melvyn I. Marquis
*Assistant Examiner*—H. H. Fletcher
*Attorney, Agent, or Firm*—Kenneth W. Brown; Barry R. Blaker; Lawrence A. Chaletsky

[57] ABSTRACT

Improved reinforced rubber compositions are provided by dispersion into a vulcanizable rubber of dehydrated precipitated silicas in combination with polyethylenimine.

7 Claims, No Drawings

PRECIPITATED SILICA REINFORCING AGENTS AND RUBBER COMPOSITIONS CONTAINING SAME

CROSS-REFERENCE

This application is a continuation-in-part of our co-pending application Ser. No. 337,824, filed Mar. 5, 1973, now abandoned.

BACKGROUND OF THE INVENTION

1. Field of the Invention

The present invention relates generally to siliceous rubber reinforcing agents and more particularly to improved precipitated silica reinforcing agent compositions.

2. Description of the Prior Art

It is well known in the rubber arts to reinforce rubber vulcanizates by dispersion in the rubber matrix of colloidal finely-divided particulate solids. To date, the principal reinforcing agents of commerce have comprised carbon blacks which, on a price performance basis, are extremely efficient reinforcing agents. However, the use of carbon black does inherently give rise to black-colored vulcanizates which is often undesirable. As a replacement for carbon black reinforcing agents in such applications as require the production of uncolored or non-black vulcanizates, there is additionally known to be employable various of the colloidal finely-divided silicas of commerce, such as arc, pyrogenic (fume) or precipitated silicas. While the arc and pyrogenic silicas are relatively efficient reinforcing agents when considered from the standpoint of weight per unit reinforcing performance, such silicas are as yet very expensive relative to the carbon blacks and thus, on a price performance basis, are economically disadvantageous. The precipitated silicas, on the other hand, are considerably less expensive than the arc or pyrogenic silicas. However, said precipitated silicas are generally found to be vastly deficient in their reinforcement performance as compared to the substantially more expensive arc or pyrogenic silicas. Thus, a discovery which results in substantial improvement in the rubber reinforcing properties of precipitated silicas would constitute a notable advance in the art. In accordance with the present invention such an advance has been provided.

In U.S. Pat. No. 3,431,231, Darcy et al., Mar. 4, 1969, there is disclosed an aftertreatment method by which siliceous oxides, including the precipitated silicas, are chemically modified by reaction thereof with certain organic amines. Included within the scope of suitable amine treating agents are alkylenimines and polymers of alkylenimines such as polyethylenimine. The major benefit of the practice of the Darcy et al. invention is disclosed to reside in substantial improvement in the aging stability of vulcanizates containing such treated siliceous materials. However, the data of the working examples of this patent also disclose that the siliceous materials treated in accordance therewith can also result in improved stress-strain properties of the vulcanizates prepared therewith. Despite the obvious benefits flowing from the practice of the Darcy et al. invention, applicants have discovered even further substantial improvements in the reinforcing properties of precipitated silicas to be available.

Further related but distinguishable subject matters are to be found in U.S. Pat. No. 3,455,717, Debus, July 15, 1969; U.S. Pat. No. 3,455,718, Dithmar et al., July 15, 1969; U.S. Pat. No. 3,592,834, Buckman et al., July 13, 1971 and U.S. Pat. No. 3,597,253, Beschke et al., Aug. 3, 1971. The Debus disclosure relates to a method for formulating stable aqueous dispersions, useful as anti-blocking agents, in which a pyrogenic silica forms the dispersed phase of the composition. The stability of such dispersions is disclosed to be substantially improved when the aqueous phase thereof contains between 1 and 3 percent by weight of polyethylenimine dissolved therein and where the aqueous phase is acidified to a pH of between 5 and 6 so as to cause an at least partial conversion of the polyethylenimine to the acid addition salt thereof. Dithmar et al. is also concerned with the provision of stable aqueous solutions containing pyrogenic silicas alone or in combination with pyrogenic aluminas. As in the Debus invention, Dithmar et al. require the presence of an acid addition salt of polyethylenimine dissolved in the aqueous phase of the dispersion. The Buckman et al. disclosure relates to what are termed therein as "organo-silica" polymers useful as sequestering, dispersing and flocculating agents in pollution control applications. Said organo-silica polymers are formed by reaction of ≡Si—O—Si≡ (siloxane) or ≡Si—OH (silanol) groups resident in the polymeric siliceous substrate with an organic comonomer or prepolymer having at least one carbon to carbon double bond and which organic comonomer or prepolymer additionally comprises at least one carboxyl, nitril or amine group through which condensation reaction with the polymeric siliceous substrate is achieved. Precipitated silicas are disclosed to be useful as siliceous polymers and the organic monomer, ethylenimine, a useful treating agent therefor. The Beschke et al. disclosure describes a method for modifying the properties of water-insoluble alkali and alkaline earth metal silicates by precipitation of the silicate from an aqueous solution thereof in the presence of a water-soluble reactive organic polymer. Among the suitable reactive organic polymers disclosed are polyethylenimine and various polyvinyl pyrrolidones. The resulting modified silicates are described as useful fillers for polymers such as silicone rubbers.

OBJECTS OF THE INVENTION

It is a principal object of the present invention to provide improved siliceous rubber reinforcing compositions.

It is another object of the invention to upgrade the rubber reinforcing properties of precipitated finely-divided silicas.

It is yet another object of the invention to provide improved silica reinforced rubber compositions.

It is another object of the invention to provide silica reinforced rubber compositions exhibiting improved stress-strain properties.

It is another object of the invention to provide silica reinforced rubber compositions exhibiting improved abrasion resistance properties.

It is another object of the invention to provide silica reinforced rubber compositions exhibiting improved dynamic properties such as reduced heat build-up.

Other objects and advantages of the present invention will in part be obvious and will in part appear hereinafter.

SUMMARY OF THE INVENTION

In accordance with the present invention it has been discovered that the rubber reinforcing properties of a precipitated silica, when employed in consort with a nitrogen-containing polar polymer adjuvant chosen from the group consisting of polyalkylenimines, polyvinyl pyrrolidones and mixtures thereof, are substantially improved when the moisture content of said silica is reduced to below about 3 weight percent thereof.

DETAILED DESCRIPTION OF THE INVENTION

The silicas useful in the practice of the invention are generally defined as those essentially amorphous, finely-divided silicas produced by acidulation or neutralization of an aqueous solution of an alkali metal silicate or ammonium silicate under conditions which inhibit the formation of gel structure. Accordingly, the precipitated silicas take the form of relatively coherent aggregates of very fine discrete particles during precipitation from solution as opposed to the gel forms of the so-called hydrogel, xerogel or aerogel process silicas. Conventionally, alkaline earth ions, for instance, $Ca^{++}$, are employed as gel formation inhibitors in the precipitated silica process. Subsequent to the precipitation step, the precipitated silica is washed substantially free of by-product soluble salts and dried.

Precipitated silicas of commerce are generally characterized by an average ultimate particle diameter of between 10 and 100 millimicrons, BET-$N_2$ surface areas of between about 40 and about 275 $m^2$/gram and moisture contents in excess of about 6 percent by weight of the silica.

In accordance with the invention, it is all-important that the moisture content of the precipitated silica employed be reduced to below about 3 percent and preferably to less than 2.0 percent by weight of the silica at the time the vulcanizable rubber/silica/adjuvant composition is vulcanized. While there is no intent to be bound by this explanation, it is believed that the presence of substantial moisture associated with the silica can result in some as yet incompletely understood deleterious reaction with the nitrogen-containing polar polymer adjuvant under the conditions of vulcanization so as to substantially diminish the reinforcement benefits of the adjuvant polymer.

The dehydration of the precipitated silica to below the 3 percent moisture content disclosed above can be readily achieved, for instance, by relatively mild heating of the silica in an oven maintained at, say, 110°-130°C for a period of time sufficient to drive off the free water content of the silica. However, in view of the known hygroscopicity of precipitated silicas, it is cautioned that mere dehydration of the silica, taken by itself, should normally be employed in the practice of the present invention only if the silica is to be compounded into the intended rubber stock substantially immediately after the dehydration step or, alternatively, if due care is used subsequent to the drying step so as to maintain the dried precipitated silica out of contact with ambient atmospheres until the time of its intended use in the rubber stock. As an example of the latter expedient, for instance, the freshly dehydrated precipitated silica may be stored in overslipped or hermetically sealed containers until the time of use. In either of the above cases, it will be further understood that vulcanization of the rubber composition should normally take place shortly after the compounding thereof, in other words, within a few days of compounding, since prolonged exposure of the unvulcanized rubber compounds to ambient relative humidities can also result in substantial loss of the reinforcement benefits wrought by the previous silica drying step. Apparently, even after compounding, there can occur a rehydration of the dehydrated silica upon prolonged exposure of the unvulcanized rubber composition to the atmosphere. Accordingly, absent attention to the above precaution, the dehydrated silica, upon exposure to the ambient environment, will normally regain much, if not all, of the original moisture content associated therewith.

In a much preferred embodiment of the invention, the dehydrated precipitated silica will be additionally treated in a suitable manner so as to markedly reduce its naturally hygroscopic character, thus affording the practitioner of the invention with the benefits of substantially improved shelf-life and less stringent handling requirements of the dried silica after dehydration thereof. Many methods for reducing the hygroscopic nature of precipitated silicas are known. For instance, the freshly dehydrated silica can be treated or reacted with minor amounts generally (less than about 10 weight percent and often less than about 5 weight percent of the silica) of organosilicon or organic compounds and/or coated with moisture barrier materials such as oils and waxes. However, we have found it very convenient to effectuate a desirable reduction in hygroscopicity of the dehydrated precipitated silica simply by calcination thereof at temperatures of between 600° and 1,000°C and preferably at temperatures of between 650° and 800°C. Said preferred range of temperatures normally provides for marked reduction in the hygroscopic nature of the precipitated silica without deleterious sintering or coalescence of the particles thereof. Accordingly, the calcination procedure can serve the dual role of both initially dehydrating the precipitated silica to below the 3 percent maximum moisture content required of the invention and additionally rendering the thusly dehydrated silica substantially less hygroscopic. It should be noted that calcination at temperatures of greater than about 600°C is generally considered to lead to removal of not only substantially all of the so-called "free" or molecular water which normally exists in the adsorbed state on the surface of the silica, but can also result in substantial reductions in the "bound" water content thereof. Said bound water is generally held to be comprised of silanol groups which, upon sufficient heating, condense with the elimination of water.

Nitrogen-containing polar polymers suitable for use in combination with the precipitated silicas of the invention are generally any of the polyalkylenimines, polyvinyl pyrrolidones and mixtures thereof. For example, polyethylenimine, polypropylenimine, polyvinyl pyrrolidone, polyvinyl-3-methyl-pyrrolidone are specific nitrogen-containing polymers useful as the polar polymer adjuvants in the present invention. Polyethylenimines, and particularly those polyethylenimines having average molecular weights of between 600 and 5,000, are preferred.

The amount of the nitrogen-containing polar polymer adjuvant employed in the present invention is subject to considerable variation and is generally not critical. Generally, the amount of said adjuvant employed will reside between about 0.5 and about 6 percent by weight of the dehydrated precipitated silica component. In the preferred embodiments of the invention, the amount of polar polymer adjuvant employed in the claimed compositions will be within the range of from about 1 to about 5 percent by weight of the dehydrated precipitated silica component.

The dehydrated precipitated silica and the polar polymer adjuvant can be compounded into the vulcanizable rubber stock separately or together. The polymer adjuvant can be dry blended with the silica or can be deposited from organic or aqueous solutions thereof. Of course, the deposition onto the silica of the polymeric adjuvant from an aqueous solution will require, as a final step, the dehydration or re-dehydration of the precipitated silica. However, said re-dehydration is generally markedly eased when the silica has been, prior to the polymeric adjuvant deposition, both dehydrated and rendered less hygroscopic, such as by calcination thereof. Accordingly, employing such non-hygroscopic silicas in depositing the polymeric adjuvant from an aqueous solution thereon generally leads to a wetted product which is more readily re-dehydrated under mild conditions to below the maximum 3 weight percent moisture concentration of the invention than would be the case were hygroscopic silicas to be so employed. Moreover, our preferred method for reducing the hygroscopicity of the silica, calcination, should normally be avoided when the polymeric adjuvant is also present in order to avoid deleterious degradation thereof. Our preferred embodiment of the siliceous reinforcing compositions of the invention are produced when the silica is dehydrated and the hygroscopicity thereof reduced. The polymeric adjuvant is then (a) dry blended with the silica or, alternatively, (b) deposited thereon from a dry organic solution thereof and the solvent removed, thereby providing rubber reinforcing compositions which may be packaged, shipped or stored for reasonable periods without deleterious reduction in the rubber reinforcing performance thereof. In addition, unvulcanized, compounded rubber stocks containing said preferred relatively non-hygroscopic silica/polymer adjuvant compositions can be stored or otherwise delayed in vulcanization with no substantial loss of reinforcement properties. Finally, the preferred relatively non-hygroscopic silica/polymeric adjuvant reinforcing agent compositions of the invention can be employed in aqueous rubber latices without substantial loss of reinforcement properties provided, of course, that the latex is dewatered and thoroughly dried within a relatively short time after incorporation therein of the dehydrated non-hygroscopic silica and polar polymer adjuvant.

Generally speaking, any sulfur vulcanizable rubbery elastomer can be beneficially reinforced by the siliceous reinforcing compositions of the invention. Thus, specific generally suitable rubbers are: natural rubber; ethylene-propylene copolymers and terpolymers; conjugated multi-olefinic hydrocarbon rubbers such as poly 1,3,-butadiene, isoprene; rubbers composed of polymers of 2,3,-dimethyl butadiene; butadiene-styrene; and butadiene-acrylonitrile; halogenated rubbers such as chloroprene; and the like.

The amount of the precipitated silica employed in the reinforcement of rubber stocks within the scope of the invention can generally vary from 35 to 75% by weight of the rubber component of the vulcanizable composition. Normally, however, sufficient reinforcement will be achieved by use of between 45 and 60% of the silica by weight of the rubber component.

It should be noted and understood that, for the purposes of the present invention, the term "compounding" as employed herein includes within its scope the dispersion of the silica reinforcing agents of the invention into rubber latices as well as by mechanical dispersion of the reinforcing agents into solid rubber stocks by mastication. As mentioned above, however, where aqueous rubber latices are to be reinforced, it is important that the dehydrated precipitated silica employed have been additionally treated so as to substantially reduce the hygroscopicity thereof.

It should be further noted that the precipitated silica reinforced sulfur vulcanizable rubber compositions of the invention may contain, in addition to the silica, polymeric adjuvant and necessary curing agents, other materials normally employed in the rubber compounding arts including fillers such as zinc oxide, calcium carbonate, clays; processing aids such as fatty acid salts, tars and oils; cure retarders; accelerators; inorganic and organic pigments; reinforcing agents other than silica/adjuvant compositions of the invention and the like.

There follow non-limiting Examples.

EXAMPLE 1

A number of rubber stocks are compounded, vulcanized and subjected to physical testing of tensile, elongation at break and modulus in accordance with the test procedures of ASTM 412-68. The reinforcing silica employed in the rubber compounds in each instance was HiSil 233, a precipitated silica produced by Pittsburgh Plate Glass Co., Pittsburgh, Pa., said silica having an average ultimate particle size of about 0.25 micron and a BET-$N_2$ (Brunaeur, Emmet and Teller) surface area of about 130 $m^2$/gram. The moisture content of this silica, as removed from commercial bags thereof, normally resides between about 6 and 9 percent by weight thereof, as determined by placing a sample of the silica in a drying balance and drying to constant weight at 110°C. The moisture content of a sample silica in weight percent, is thus the weight loss during drying divided by the dry weight times 100.

The generalized compounding procedure employed in the preparation of the rubber samples is as follows:

Step 1

The rubber, silica and, if employed, the polymeric adjuvant are charged into a Banbury mixer, cooled by circulating tap water and compounded for about 6 minutes at 77 r.p.m. At the end of said 6 minute period there is added to the charge the processing oil, stearic acid and antioxidant components of the formulation and the compounding of the stock continued for an additional 2 minutes at 77 r.p.m. At the end of this period the circulating cooling water is turned off, the mixer speed is increased to 115 r.p.m. and the compound dumped at a temperature of about 350°F. The dumped stock is then sheeted out on a cold mill.

Step 2

The sheet stock is again charged into the Banbury mixer; however, in this step the mixer is cooled by circulation therethrough of cold water. Substantially immediately after the rubber stock is charged there is additionally charged into the mixer the zinc oxide component. After 2 minutes of compounding at a speed of 77 r.p.m. there is then added the accelerator component of the formulation and the compounding continued for an additional 3 minutes at 77 r.p.m. At the end of this period the compound is dumped and cooled.

Step 3

The cooled compound is banded on a water-cooled two roll mill, the nip formed between the rolls being about 0.070 inch. Immediately upon formation of a smooth band of the rubber stock there is added the sulfur curing agent and the compound thereafter milled for an additional 3 minutes. During the period of sulfur compounding the rubber composition is subjected to multiple ¾-width cuts on the mill. At the end of the compounding period the rubber composition is subjected to ten endrolls on the mill, sheeted out and cooled.

Step 4

Vulcanization. The time required to effect 90% of complete cure of each of the sample rubber stocks at 293°F is determined by separate testing of a portion of each sample in a Monsanto Model LS Oscillating-Disk Rheometer. Said rheometer broadly comprises a sample chamber equipped with heating means and an oscillatable driven disk positioned therein. Said disk is equipped with means to monitor the torque required to oscillate said disk at constant frequency. A curing rubber sample within the chamber thus requires increasing torque to hold the disk at constant frequency as a function of increasing state of cure. The time required for 90% cure of the rubber stock is defined as:

$$T_{90} = (0.9 \Delta L_t + L_{mt})$$

where $T_{90}$ is the time to achieve 90% cure; $\Delta L_t$ is the elapsed time between the minimum torque reading and the maximum torque reading and $L_{mt}$ is the elapsed time between start-up of the device and the minimum torque reading. Having thus determined the time required for the sample to attain 90% of full cure at 293°F, the remaining rubber sample is molded into test sheets and vulcanized in the mold under similar conditions of time and temperature.

The specific rubber formulations for Samples A through G are tabularized in Table I, wherein all column figures represent weight parts of the listed ingredients.

TABLE I

| SAMPLE | A | B | C | D | E | F | G |
|---|---|---|---|---|---|---|---|
| SBR-1502[1] | 100 | 100 | 100 | 100 | 100 | 100 | 100 |
| Circolite[2] | 10 | 10 | 10 | 10 | 10 | 10 | 10 |
| Stearic Acid | 1.0 | 1.0 | 1.0 | 1.0 | 1.0 | 1.0 | 1.0 |
| Flexamine[3] | 1.0 | 1.0 | 1.0 | 1.0 | 1.0 | 1.0 | 1.0 |
| Wing Stay 100[4] | 1.0 | 1.0 | 1.0 | 1.0 | 1.0 | 1.0 | 1.0 |
| ZnO | 4.0 | 4.0 | 4.0 | 4.0 | 4.0 | 4.0 | 4.0 |
| Sulfur | 2.75 | 2.5 | 2.75 | 2.5 | 2.75 | 2.75 | 2.75 |
| di-ortho-tolylguanidine | 1.5 | 1.5 | 1.5 | 1.5 | 1.5 | 1.5 | 1.5 |
| 2,2'-benzothiazyl disulfide | 1.5 | 1.5 | 1.5 | 1.5 | 1.5 | 1.5 | 1.5 |
| Silica | 60 | 60 | 60 | 60 | 60 | 60 | 60 |
| Polyethylenimine (average molecular weight 1800) | — | 1.2 | — | 1.2 | — | 1.2 | — |
| Polyethylenimine (average molecular weight 600) | — | — | — | — | — | — | 1.2 |

[1] a styrene/1,3-butadiene cold SBR comprising 23.5% styrene.
[2] a naphthenic rubber processing oil, produced by Sun Oil Company, Philadelphia, Pennsylvania.
[3] an anti-oxidant comprising 65 percent by weight of a complex diarylamine-ketone and 35 percent by weight of n,n'-diphenyl-p-phenylene diamine, produced by Uniroyal Chemical Co., Naugatuck, Connecticut.
[4] a paraphenylenediamine derivative stabilizer, produced by The Goodyear Tire and Rubber Co., Akron, Ohio.

The specific treatments of the silica fillers preparatory to compounding thereof into the rubber samples, the polymeric adjuvant employed, if any, and the physical test data relating to the rubber samples are presented in Table II, below:

TABLE II

| Sample | Silica Treatment | Silica Moisture Content (wt. %) | Polymer Adjuvant | Polymer Adjuvant Content (wt. % of silica) |
|---|---|---|---|---|
| A | None, Control | 6 | None | None |
| B | None | 6 | PEI-18 | 2 |
| C | Dried at 110°C, overnight | 1.5 | None | None |
| D | Dried at 110°C, overnight | 2 | PEI-18 | 2 |
| E | Calcined at 800°C, 2 hours | 1.8 | None | None |
| F | Calcined at 800°C, 2 hours | 2.0 | PEI-18 | 2 |
| G | Calcined at 800°C, 2 hours | 2.0 | PEI-6 | 2 |

TABLE II (Continued)

| Sample | ASTM D-412-68 | | | Heat Build-up Goodrich Flexometer ASTM D-623 (°F) | Rebound Goodyear-Healey ASTM D-1054 (% Re) | Akron Angle Abrasion Index Brit. Standards 903, Part 24: 1950 (loss/10⁶ rev.) |
|---|---|---|---|---|---|---|
| | Tensile (p.s.i.) | Elong. at yield (%) | Modulus (300% extension p.s.i.) | | | |
| A | 2465 | 520 | 900 | 66 | 65.9 | 492 |
| B | 2775 | 520 | 1020 | — | — | — |
| C | 2750 | 630 | 800 | — | — | — |
| D | 3360 | 560 | 1315 | — | — | — |
| E | 2105 | 495 | 1070 | 55 | 64.5 | 616 |
| F | 2900 | 400 | 1885 | 36 | 70.1 | 358 |
| G | 2710 | 360 | 2090 | 33 | 68.6 | 568 |

EXAMPLE 2

Sample SBR rubber stocks having formulations similar to those of Samples A, C and E through G of Example 1 are prepared. However, in the instant Example, the reinforcing silica compositions of the invention are prepared by slurrying of the silica in an aqueous solution of the polymeric adjuvant for a period of about three hours. The resulting system is then filtered and the collected solid product dried for about 20 hours at 110°C. Pertinent data is presented in Table III, below:

TABLE III

| Sample | Silica Treatment | Silica Moisture Content (wt.%) | Polymer Adjuvant | Polymer Adjuvant Content (wt.% of silica) |
|---|---|---|---|---|
| H | Heated at 110°C for 2 hours (Control) | 3.0 | None | None |
| I | Slurried, filtered and dried for 20 hours at 110°C | 5.0 | PEI-12[1] | 5.0 |
| J | Slurried, filtered and dried for 40 hours at 110°C | 2.0 | PEI-12[1] | 5.0 |
| K | Slurried, filtered and dried for 20 hours at 110°C | 3.0 | PVP-15[2] | 5.0 |

[1] Polyethylenimine, average molecular weight 1200.
[2] Polyvinyl pyrrolidone, average molecular weight 15,000.

TABLE III (Continued)

| Sample | ASTM D-412-68 Tensile (p.s.i.) | Elong. at break (%) | Modulus (300%) extension p.s.i. | Heat Build-up Goodrich Flexometer ASTM D-623 (°F) | Rebound Goodyear-Healey ASTM D-1054 (% Re) | Akron Angle Abrasion Index Brit. Standards 903, Part 24: 1950 (loss/10⁶ rev.) |
|---|---|---|---|---|---|---|
| H | 1510 | 410 | 930 | 48 | 64.5 | 584 |
| I | 2400 | 420 | 1590 | 31 | 65.2 | 345 |
| J | 3280 | 440 | 1700 | 32 | 66.0 | 280 |
| K | 2430 | 470 | 1140 | 44 | 57.1 | 350 |

While this invention has been described with respect to certain embodiments, it is not so limited, and it should be understood that variations and modifications thereof may be made which are obvious to those skilled in the art without departing from the spirit or scope of the invention.

What is claimed is:

1. A siliceous rubber reinforcing composition comprising:
   a. precipitated dehydrated silica having an average ultimate particle diameter of between about 10 and about 100 millimicrons; a BET-$N_2$ surface area of between about 40 and about 275 m²/g and a free water content of less than about 3 percent by weight thereof, and
   b. between about 0.5 and about 6 percent by weight of said precipitated silica of polyethylenimine.

2. The composition of claim 1 wherein said precipitated dehydrated silica of (a) is treated so as to reduce the hygroscopicity thereof.

3. The composition of claim 2 wherein said dehydrated precipitated silica is treated by calcination thereof at temperatures of between about 600° and 1000°C.

4. The composition of claim 3 wherein said dehydrated precipitated silica is treated by calcination thereof at temperatures of between about 650° and about 800°C.

5. The composition of claim 1 wherein said polyethylenimine has an average molecular weight of between about 600 and about 5,000.

6. The composition of claim 1 wherein said polyethylenimine is present in the amount of between about 1 to 5 percent by weight of the dehydrated precipitated silica component of (a).

7. The composition of claim 1 wherein said dehydrated precipitated silica of (a) has a moisture content of less than about 2 percent by weight thereof.

* * * * *